(12) United States Patent
Faulkner et al.

(10) Patent No.: US 10,563,987 B2
(45) Date of Patent: *Feb. 18, 2020

(54) INERTIAL NAVIGATION SYSTEM

(71) Applicant: Atlantic Inertial Systems Limited, Plymouth, Devon (GB)

(72) Inventors: Nicholas M. Faulkner, Plymouth (GB); John Keith Sheard, Plymouth (GB)

(73) Assignee: ATLANTIC INERTIAL SYSTEMS, LIMITED, Devon (GB)

(*) Notice: Subject to any disclaimer, the term of this patent is extended or adjusted under 35 U.S.C. 154(b) by 289 days.

This patent is subject to a terminal disclaimer.

(21) Appl. No.: 15/604,745

(22) Filed: May 25, 2017

(65) Prior Publication Data

US 2017/0363428 A1 Dec. 21, 2017

(30) Foreign Application Priority Data

Jun. 20, 2016 (GB) .................................. 1610747.6

(51) Int. Cl.
| | | |
|---|---|---|
| *G01C 21/18* | (2006.01) | |
| *G01C 21/16* | (2006.01) | |
| *G01S 19/49* | (2010.01) | |

(52) U.S. Cl.
CPC ............ *G01C 21/165* (2013.01); *G01S 19/49* (2013.01)

(58) Field of Classification Search
CPC ...... G01C 21/16; G01C 21/18; G01C 25/005; G01C 21/165; G01S 19/48; G01S 19/54; G01S 19/49; F41G 7/36; G05D 1/108; G42B 15/01

See application file for complete search history.

(56) References Cited

U.S. PATENT DOCUMENTS 5,788,180 A * 8/1998 Sallee ..................... F41G 7/222
244/3.15
8,047,070 B2 11/2011 Tyree
(Continued)

FOREIGN PATENT DOCUMENTS

| EP | 1936835 A2 | 6/2008 |
| GB | 2526508 A | 12/2015 |
| WO | 2016067011 A1 | 5/2016 |

OTHER PUBLICATIONS

Kreichauf et al., Estimation of the Roll Angle in a Spinning Guided Munition Shell, 2006, IEEE, p. 1-5 (Year: 2006).*

(Continued)

*Primary Examiner* — McDieunel Marc
(74) *Attorney, Agent, or Firm* — Cantor Colburn LLP (57) ABSTRACT

An inertial measurement system for a spinning projectile comprising: first (roll), second and third gyros with axes arranged such that they define a three dimensional coordinate system; at least a first linear accelerometer; a controller, arranged to: compute a current projectile attitude comprising a roll angle, a pitch angle and a yaw angle; compute a current velocity vector from the accelerometer; combine a magnitude of said velocity vector with an expected direction for said vector to form a pseudo-velocity vector; provide the velocity vector and the pseudo-velocity vector to a Kalman filter that outputs a roll gyro scale factor error calculated as a function of the difference between the velocity vector and the pseudo-velocity vector; and apply the roll gyro scale factor error from the Kalman filter as a correction to the output of the roll gyro.

15 Claims, 3 Drawing Sheets

(56) References Cited

U.S. PATENT DOCUMENTS

| | | | | |
|---|---|---|---|---|
| 2006/0169833 A1* | 8/2006 | Lamorlette | ............ | F41G 7/346 244/3.2 |
| 2012/0043410 A1 | 2/2012 | Geswender et al. | | |
| 2012/0223180 A1* | 9/2012 | Axford | ................. | F42B 10/12 244/3.21 |
| 2012/0256038 A1* | 10/2012 | Elwell, Jr. | .............. | F42B 12/22 244/3.2 |
| 2017/0016728 A1* | 1/2017 | Sheard | ................ | G01C 19/025 |
| 2017/0160306 A1* | 6/2017 | Sheard | ................ | F42B 15/01 |
| 2017/0322030 A1* | 11/2017 | Sheard | ................... | G01C 21/16 |
| 2017/0363428 A1* | 12/2017 | Faulkner | ............ | G01C 21/165 |
| 2018/0340779 A1* | 11/2018 | Faulkner | ............... | G01C 21/16 |

OTHER PUBLICATIONS

Kuhn, Aspects of pure and satellite-aided inertial navigation for gun-launched munitions, 2004, IEEE, p. 327-336 (Year: 2004).*

Min et al., Study on the attitude control for High-speed Rotary Missile based on neural networks, 2011, IEEE, p. 428-430 (Year: 2011).*

Crassidis, Sigma-point Kalman filtering for integrated GPS and inertial navigation, 2006, IEEE, p. 750-756 (Year: 2006).*

European Search Report for Application No. 17275081.2-1557, dated Nov. 16, 2017 7 pages.

Intellectual Property Office Search Report for Great Britain Application No. 1610747.6 dated Dec. 15, 2016, 3 pages.

Luisa D. Fairfax et al., "Position Estimation for Projectiles Using Low-cost Sensors and Flight Dynamics", Army Research Laboratory, Apr. 2012, 38 pages.

Michael J. Wilson, "Attitude Determination With Magnetometers for Gun-Launched Munitions", Army Research Laboratory, Aug. 2004, 23 pages.

Thomas E. Harkins, "On the Viability of Magnetometer-Based Projectile Orientation Measurements", Army Research Laboratory, Nov. 2007, 35 pages.

* cited by examiner

INERTIAL NAVIGATION SYSTEM

FOREIGN PRIORITY

This application claims priority to Great Britain Patent Application No. 1610747.6 filed Jun. 20, 2016, the entire contents of which is incorporated herein by reference.

TECHNICAL FIELD

This disclosure relates to inertial navigation systems, in particular those used for projectiles e.g. guided rockets. Inertial navigation systems can be used on guided projectiles to provide position information which can in turn be used to correct the projectile's course to keep it on target.

BACKGROUND

Navigation systems can use a variety of different sensors to detect changes to the motion and orientation of an object. For example accelerometers, gyros and magnetometers are often used. Accelerometers detect applied force, gyros detect rotation rates and magnetometers detect the Earth's magnetic field and so can be used to determine absolute orientation.

Inertial navigation systems, based on accelerometers and gyroscopes, can be used either on their own or together with other navigation systems such as GPS. Navigation/guidance of rockets and other munitions is often based on the use of micro-electro-mechanical (MEMS) sensors due to their small size and low-cost. The accuracy of these sensors is relatively poor and not sufficient to meet typical navigation requirements unless external sensors are used to estimate and correct the inertial sensor errors. Using additional aiding sensors in this way is the basis of what is known as 'integrated navigation'.

Integrated navigation is usually based on an algorithmic technique known as Kalman Filtering, a process which blends data from the inertial sensors and external aiding sensors in an optimal way. For this technique to operate robustly, navigation errors must be maintained within certain limits at all times else the linearity assumptions on which the Kalman filter is founded will not be valid and the integrated navigation solution may become grossly inaccurate. It is desirable to avoid this situation by constraining navigation error growth during projectile flight.

When considering navigation Kalman filtering for applications involving rockets, missiles and other rotating platforms, initialising and maintaining an accurate roll (bank) angle presents the biggest challenge. An analysis of the problems associated with the use of inertial guidance technology in such applications is provided by J. S. Bird in "Inertial Sensor Performance Requirements for a Long Range Artillery Rocket" (DTIC ADA279936), with the conclusion that the roll gyro scale factor accuracy is critical and needs to be less than 5 parts-per-million (ppm).

Unfortunately, inexpensive low grade MEMS gyroscopes have a scale factor error of several thousand ppm. Using a gyroscope with a scale factor accuracy of less than 5 ppm would not be practical in terms of cost. Therefore there is a need for a system that can achieve the desired accuracy using inexpensive sensors with much lower scale factor accuracy.

The errors in gyroscope sensors are broadly divided into bias errors and scale factor errors. Although these and other errors are measured and removed as part of a factory calibration process, there will always be residual errors present when the sensors are actually used. These arise for a variety of reasons such as temperature and humidity changes, as well as other physical stresses affecting the unit. In general these errors may be different each time the unit is switched on.

As discussed in the above-referenced paper by J. S. Bird, in strapdown inertial navigation systems (i.e. those in which the inertial sensors are fixed to the body of the airframe as opposed to those in which the sensors are mounted on a gimballed platform that is free to rotate and so remain level at all times), one of the biggest problems comes from high roll rates. Typically roll rates for ballistic projectiles may be of the order of 10-20 full rotations per second, i.e. rotation rates of the order of a few thousand degrees per second. Therefore with a typical roll rate scale factor error of 1000 ppm, the roll angle (bank angle) calculated from this gyro would accumulate an error of a few degrees per second. For a typical projectile range of 30 to 60 km and a typical flight time of 1 to 2 minutes, this error quickly mounts up to be unacceptable.

Gyro bias error can readily be compensated immediately prior to use by averaging a series of readings while the gyro is known to be in a non-rotating state, e.g. prior to launch in the case of a projectile such as a rocket or missile. However, the scale factor error is rate-dependent and may not be measured and corrected whilst stationary. This suggests the need for a scale factor error correction process which operates in-flight, in a wholly self-contained fashion. This disclosure details such a process.

Alternative techniques which have been used in attempts to maintain roll accuracy include the use of non-inertial sensor aiding such as magnetometer, light sensor, GPS and/or thermopiles. These approaches add complexity and cost and introduce additional performance constraints. See for example "Attitude Determination with Magnetometers for un-Launched Munitions", M. J. Wilson, DTIC ADA425992; and "On the Viability of Magnetometer-Based Projectile Orientation Measurements", T. E. Harkins, DTIC ADA474475.

"Position Estimation for Projectiles Using Low-cost Sensors and Flight Dynamics" by L. D. Fairfax and F. E. Fresconi (DTIC ADA560811) describes another solution to this problem for gun-launched mortars which relies upon a multi-state Extended Kalman Filter to estimate position and velocity, but roll angle is determined via additional attitude aiding. This technique is applied to an application with a more benign roll rate profile than a typical artillery rocket.

U.S. Pat. No. 8,047,070 describes a process for estimating the roll angle of a gun-launched projectile. U.S. Pat. No. 8,047,070 uses body angular rate data as its measurements, as opposed to derived Euler angles. It also does not estimate or correct the roll rate scale factor error and it does not operate to preserve elevation and heading accuracy.

SUMMARY

According to this disclosure there is provided an inertial measurement system for a spinning projectile comprising: a first, roll gyro to be oriented substantially parallel to the spin axis of the projectile; a second gyro and a third gyro with axes arranged with respect to the roll gyro such that they define a three dimensional coordinate system; at least a first linear accelerometer; a controller, arranged to: compute a current projectile attitude from the outputs of the first, second and third gyros, the computed attitude comprising a roll angle, a pitch angle and a yaw angle; compute a current projectile velocity vector from at least the output of the first linear accelerometer; combine a magnitude of said velocity vector with an expected direction for said vector to form a current projectile pseudo-velocity vector; provide the velocity vector and the pseudo-velocity vector to a Kalman filter that outputs a roll gyro scale factor error calculated as a function of the difference between the velocity vector and the pseudo-velocity vector; and apply the roll gyro scale factor error from the Kalman filter as a correction to the output of the roll gyro.

Unlike previous efforts to calibrate the roll axis gyro scale factor, this system does not rely on an Euler rate filter, instead using an error observation process that is more direct and hence more sensitive. By avoiding the Euler rate filter, this approach avoids the tuning requirements associated with the Euler rate filter and it allows the problem to be handled wholly within a Kalman filter architecture. The tuning requirements of the Euler rate filter lead to the need for application-specific software configurations while this improved approach can be applied more generally without such configuration.

This process exploits the fact that rolling projectiles such as guided munitions generally follow a predictable trajectory when not subject to controlled guidance. For example, they may travel on a fixed heading, or on a heading that varies in a predictable way as a function of flight time. Many such platforms employ low-cost, relatively low-performance MEMS gyros to maintain an attitude solution. Under rolling motion, significant roll angle errors will arise in the absence of any independent assistance from aiding sensors. The effect of this error is that the drag force experienced in the longitudinal axis is mis-resolved when transformed from the body frame to the navigation frame, leading to cross-track and vertical velocity errors. For example, the projectile may be assumed to be following a ballistic trajectory, such that when viewed side-on there is the familiar arcing motion as the pitch angle gradually reduces—it starts with a positive pitch angle, e.g. +45 degrees and ends at a negative angle, e.g. −45 degrees. This pitching motion is measured by the on-board gyros, but when the measured angular rates are resolved into the navigation frame any error in the roll angle causes some of the pitching motion to appear in the wrong axes—one effect is that the estimated heading starts to drift off and become misaligned with the true heading. A consequence of the gradually increasing heading error is that the drag force acting on the longitudinal axis of the projectile is mis-resolved into the navigation frame, as described above. The magnitude of the velocity errors is directly related to the roll angle error and thus to the roll gyro scale factor error. The latter can thus be estimated if the velocity error can be detected/observed.

This approach recognises that cross-track velocity errors (i.e. velocity errors perpendicular to the direction of travel) can be detected by synthesizing velocity 'pseudo-measurements'. These pseudo-measurements are generated by combining the magnitude of the measured velocity vector in the body frame (i.e. the measured speed of the projectile) with the expected direction of the projectile in the navigation frame. The difference between these pseudo-measurements and the velocity estimates from the navigation process provide direct observability of the cross-track velocity error. Integrating these algorithmic features within a Kalman filter architecture can lead to optimal estimation of the roll gyro scale factor error. It has been found that supplying the Kalman filter with these velocity pseudo-measurements provides a navigation solution with little or no tuning requirements. This process provides the Kalman filter with visibility of (i.e. information on) the error that is most directly correlated with the roll rate and thus with the roll gyro scale factor error. Further, it allows a complete solution to be formed within the Kalman filter which leads to a much simpler and more efficient architecture (which is easier to maintain and extend).

Although a simple solution may operate based on a single linear accelerometer aligned along the roll axis, a more accurate projectile velocity can be calculated from a plurality of linear accelerometers. Therefore in preferred examples, the inertial measurement system further comprises a second and a third linear accelerometer, wherein the first second and third accelerometers have sense axes arranged such that they define a three dimensional coordinate system. The first linear accelerometer preferably has its sense axis along the spin axis of the projectile. The second and third accelerometers (if present) may be arranged with sense axes orthogonal to the first accelerometer.

It will be appreciated that the pseudo-measurements may be generated by resolving the estimated speed of the platform into north and east components (or other convenient components) using the 'expected heading' (e.g. the initial launch heading in the case of a purely ballistic flight or in the more general case this may be a heading taken from a flight plan as a function of time). In some preferred examples only two components are used to form a two-dimensional pseudo-velocity vector (e.g. North and East components). This simplifies the calculations and is sufficient for most purposes as the horizontal plane is most sensitive to cross-track errors. However, in other examples a full three dimensional processing may be performed, resolving the pseudo-velocity into three components (e.g. North, East and Down components) and processing all three components with the Kalman filter.

This system provides improved calibration of the roll axis rate gyro scale factor, e.g. of an Inertial Measurement Unit (IMU) fitted to a rolling projectile. As discussed above, the errors in the roll rate measurement are the most significant source of error in high roll rate navigation systems. Earlier systems have struggled to cope with the high roll rates that are present in the earliest phase of flight, i.e. immediately after launch, and attempts have been made to mitigate these effects. For example one possibility could be to employ an intermediate attitude reset function to reset the attitude at some point in time after the initial high roll rate has reduced to more manageable levels. Such an attitude reset function might for example use linear accelerometers to provide measurements of the current velocity and then trigger the reset based on the measured velocity. The system according to this disclosure does not require any such attitude reset and can instead be operated right from launch, providing good roll rate correction even during the high roll rate phase immediately after launch.

Existing systems that have used Kalman filters have struggled to achieve stability in the filter due to the high roll rates and the rapid accumulation of roll angle error. The approach described here allows the Kalman filter to operate stably, producing accurate and stable roll angle and scale factor corrections.

The Kalman filter estimates various state parameters by combining current estimates with measurements (observations), e.g. from sensors, in a way that is statistically optimal. The numeric blending is effected via a set of Kalman gain factors which are derived from the evolving uncertainties in the estimated variables and the quality of the externally supplied measurements. The gains are time-varying and this statistically optimal blending process results in more accurate calculations of roll angle error and roll rate scale factor error under a wide range of operating conditions compared with previous systems which have used fixed gains.

In the present case the Kalman filter preferably includes a standard navigation error model one component of which embodies the relationship between velocity and attitude errors such that the filter is capable of inferring attitude errors from the velocity errors that arise when forces applied to the projectile are mis-resolved into the navigation frame of reference.

In the Kalman filter, the difference between the velocity vector and the pseudo-velocity vector is preferably treated as a velocity component of a Kalman filter innovation vector. In a Kalman filter, new information enters the filter via the 'innovation' which is normally the difference between the current estimate of some variable and an independent measurement of the same variable. In the present case, a velocity innovation vector is calculated using the current estimates of velocity from the inertial navigation system and a pseudo-velocity vector created by resolving the estimated speed of the projectile through the expected heading angle. This pseudo-measurement update process keeps the filter stable during the early period of projectile flight. There may of course be multiple observations and multiple corresponding innovations within the Kalman filter, with the other innovations being calculated in the traditional manner.

The Kalman filter is preferably arranged to update its state vector by adding a product of its gain matrix and the innovation vector.

The pseudo-velocity measurements are essentially manufactured measurements which are treated as real measurements by the Kalman filter. In other words they are treated as measurements from a sensor even though that sensor does not really exist. The pseudo-velocity measurements are only accurate in a ratio-metric sense and their accuracy in an absolute sense will be subject to all the normal errors arising within the inertial navigation systems. As a result, estimates of the position and velocity variables may become quite inaccurate. This is not a problem as by far the most significant problem in the early stage of flight is keeping track of the roll angle accurately. Therefore this approach allows the other estimates to drift in exchange for a better tracking of the roll angle. The other filter state variables can then be corrected later in flight. A consequence of this approach is that state uncertainties calculated by the filter during the pseudo-velocity measurement update phase will become falsely optimistic in respect of the position and velocity states. Later in the flight when more accurate measurements are available e.g. from a GPS system, the erroneous position and velocity uncertainties will lead the filter to preferentially propagate the existing estimates rather than correct them using the accurate measurements that are available. To address this problem, the controller of the inertial measurement system is preferably arranged to introduce system noise into the filter at the start of a second flight phase. The second flight phase may correspond to the acquisition of another positioning signal (such as GPS). The introduction of system noise into the filter at this point will increase the prevailing uncertainty values, allowing the filter to take proper account of the newly acquired positioning measurements and allowing rapid convergence. Preferably the noise is introduced as noise on the filter's velocity states. This elevated velocity uncertainty propagates through quite naturally to the position states and so there is no need to explicitly manipulate the position uncertainties. The system noise may be introduced for a fixed period of time after the start of the second flight phase to allow the filter to converge before the additional noise is cancelled and normal filter operation resumes.

Accordingly, the controller is preferably further arranged to increase velocity uncertainty in the Kalman filter when a subsequent phase of projectile flight commences. The subsequent phase of flight may begin when a GPS signal (or other positioning signal) is acquired.

The controller may be arranged to increase velocity uncertainty for a predetermined period of time, e.g. for a certain period of time after the subsequent flight phase begins, sufficient to allow the filter to converge and/or establish viable uncertainty estimates. The controller may be arranged to increase velocity uncertainty by adding system noise to the Kalman filter. As discussed above, this noise need only be added to the velocity components of the Kalman filter.

The model in the Kalman filter may be of varying degrees of complexity. For example it may just be designed to model the roll angle error and roll scale factor error or it may involve additional complexity such as estimating and correcting for crosswind effects. The model may take many different forms and may vary according to application. The model may involve the use of various filter state parameters from among: position, velocity, acceleration, roll rate, pitch rate, drag, meteorological conditions such as wind.

The Kalman filter preferably also receives measurements from the various on board sensors, particularly the first, second and third gyros and/or the first, second and third linear accelerometers and optionally other sensors such as temperature and/or wind sensors, GPS sensors, etc. which may be used in generating the updated filter state.

In some examples the controller may be arranged to supply meteorological data to the filter as an initial condition for the Kalman filter. In this way the process can exploit prior knowledge of meteorological conditions when such data is available. This may be provided as an a priori estimate of crosswind velocity which is stored within the filter and the filter then estimates and corrects for the error in this a priori estimate.

In some preferred examples, the projectile is a longitudinal projectile and the spin axis is the longitudinal axis.

It will be appreciated that this disclosure relates to any platform where there is some spinning motion for at least part of the mission. It does not have to be spinning all the time. These platforms may be spin-stabilised (i.e. the spin is deliberately introduced to provide stability, such as is the case with artillery shells for example). Conversely, the spin may be incidental, for example introduced as a side effect of the way the rocket motor works. These latter platforms may have fins and can be more stable than artillery shells, but they still spin, albeit at lower rates.

In many applications the rotation rate of the platform may be variable (for example the roll rate may reduce during flight due to friction effects with air, as is the case for a projectile launched from a rifled barrel for instance) and the underlying roll gyro scale factor produces error effects which are correlated with the roll rate. The model in the Kalman filter preferably models such relationship.

The controller may be arranged to apply the roll rate scale factor correction directly to the roll gyro output, and may be arranged to apply the roll angle correction to an attitude integration unit.

Preferably the roll gyro is a MEMS (Micro Electro Mechanical System) gyro. All three gyros may be MEMS gyros. In some examples, the roll gyro may be a MEMS gyro with a rate scale factor error of greater than 100 parts per million. In some examples, the rate scale factor error may be greater than 1000 parts per million. As the scale factor error can be corrected by the feedback system, a high scale factor error can be tolerated. Thus lower quality, less expensive components can be used, reducing the cost of the system while maintaining excellent accuracy. In particular these inexpensive gyros can be used with a Kalman filter for ultimately attaining improved processing and accuracy.

In some examples, the expected values for heading and elevation angles as a function of time may correspond to those expected from planar ballistic flight. Planar ballistic flight refers to the trajectory that results when the only significant forces acting on the airframe are gravity and aerodynamic drag acting in the longitudinal axis. In general, there will always be other forces present. Some of these will either be small or will have a neutral deflection effect due to the rolling motion of the airframe. Others, such as the crosswind effects can be compensated by the Kalman filter in the subsequent stage of correction.

However, the ballistic flight trajectory is in some examples considered to be substantially in one plane and during such flight the heading angle (yaw angle) is not expected to change for the duration of that flight. At the same time, the elevation angle (pitch angle) is expected to decrease at a known rate throughout the flight as a spinning projectile (which is typically longitudinal) tends to orientate itself at a tangent to its trajectory. Note that this flight may be one phase of a more complex flight plan, with subsequent phases involving corrective manoeuvres that deviate from the planar trajectory.

In the case of projectiles that do not follow a purely planar trajectory, but still follow a predictable trajectory, the predicted heading and elevation angles (or angle rates) throughout the flight can still be used as reference values. One such example would be a spin-stabilised artillery shell which spins at very high rate (greater than 100 revolutions per second), which results in many forces which act to deflect the course of the shell. Any deviation of heading and elevation angles (or angle rates) from the reference values can be taken to have resulted from errors in the roll angle calculation. In such cases, pre-computed flight trajectory information is loaded into the on-board navigation system. This may be in the form of a flight path aiding table (FPAT) or similar. For many projectiles/munitions, the likely flight trajectory from launch point to target is established during a pre-launch mission planning process. This process usually yields tabular data describing the expected position, velocity and attitude of the projectile as a function of flight time (the FPAT). This data may be transferred to the projectile and used during flight for various purposes related to navigation/guidance. The expected yaw and pitch values can be continuously looked up during the flight as required. Therefore the expected values for pitch and yaw angles as a function of time may be taken from pre-computed flight trajectory information which may be non-planar. Angle rates, if used, may be included in this information or calculated from it.

The process described here to correct the roll axis gyro scale factor error and roll angle correction is complementary to other systems and can be used in combination with them, or it can be used as a standalone system. The system may be used with either simple or complex systems, with the roll scale factor error correction either being the sole feedback element or being complementary to other corrections and/or feedback mechanisms.

In some examples, the roll angle correction and roll scale factor correction may only be applied prior to any guidance action being initiated.

According to another aspect, this disclosure provides a method of correcting roll angle in an inertial measurement system for a spinning projectile, comprising: computing a current projectile attitude from the outputs of first, second and third gyros, the computed attitude comprising a roll angle, a pitch angle and a yaw angle; computing a current projectile velocity vector from the outputs of at least a first linear accelerometer; combining a magnitude of said velocity vector with an expected direction for said vector to form a current projectile pseudo-velocity vector; providing the velocity vector and the pseudo-velocity vector to a Kalman filter that outputs a roll gyro scale factor error calculated as a function of the difference between the velocity vector and the pseudo-velocity vector; and applying the roll gyro scale factor error from the Kalman filter as a correction to the output of a roll gyro.

All of the preferred features described above in relation to the system are equally applicable to the corresponding methods. In preferred examples, the method and system are particularly applicable to high roll rate projectiles, i.e. projectiles intended to be imparted with a high roll rate during flight, e.g. greater than 5, greater than 10 or greater than 15 revolutions per second.

BRIEF DESCRIPTION OF DRAWINGS

One or more non-limiting examples will now be described, by way of example only, and with reference to the accompanying figures in which.

The following describes a method to perform in-flight calibration of (i.e. to measure and correct) the roll axis rate gyro scale factor for an Inertial Measurement Unit (IMU) fitted to a rolling projectile 100.

Figures 1A, 1B:
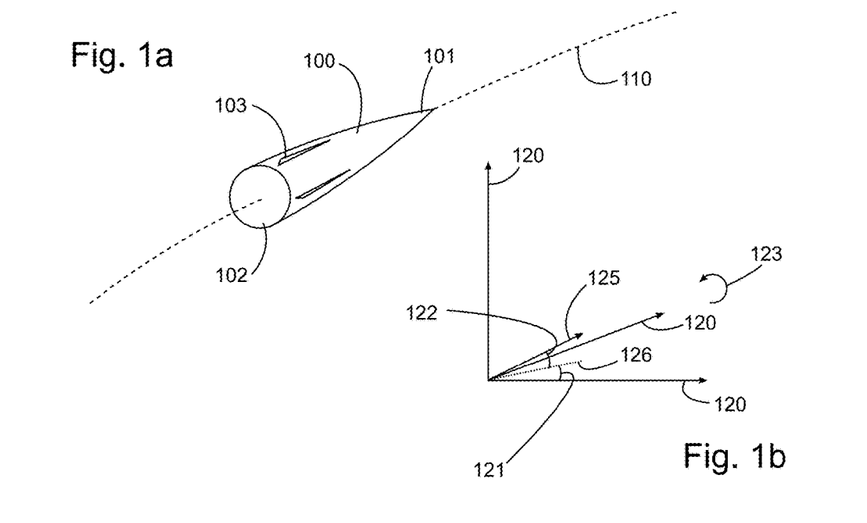
FIG. 1a shows a projectile in flight.
FIG. 1b illustrates the attitude of the projectile.

FIG. 1a illustrates a rocket 100 in flight. Its trajectory 110 is shown in broken line. The rocket 100 has a nose 101, tail 102 with fins 103. Fins 103 may be static or they may be movable so as to provide directional control so as to alter the flight path of the rocket 100.

In inertial navigation terminology, the orientation of a body/platform is described in terms of the three Euler angles 'heading', 'elevation' and 'bank'. The equivalent terms 'yaw', 'pitch' and 'roll' are also in use. The body orientation is generally referred to using the term 'attitude'. Although strictly speaking the term 'attitude' refers only to the elevation and bank angles, in this document, the more general definition is used. Therefore in this document, the term 'attitude' refers to all three of heading, elevation and bank (or equivalently yaw, pitch and roll).

In FIG. 1b the attitude 125 of the rocket 100 is shown with respect to the axes 120 of the navigation frame of reference. The projection of the attitude 125 onto the horizontal plane is shown by dotted line 126. The heading or yaw angle of the rocket is shown by the angle 121, the elevation or pitch angle of the rocket is shown by the angle 122 and the bank or roll angle of the rocket about its longitudinal axis is indicated by arrow 123. The rocket 100 is rotating anti-clockwise when viewed from behind as shown.

Figure 1C:
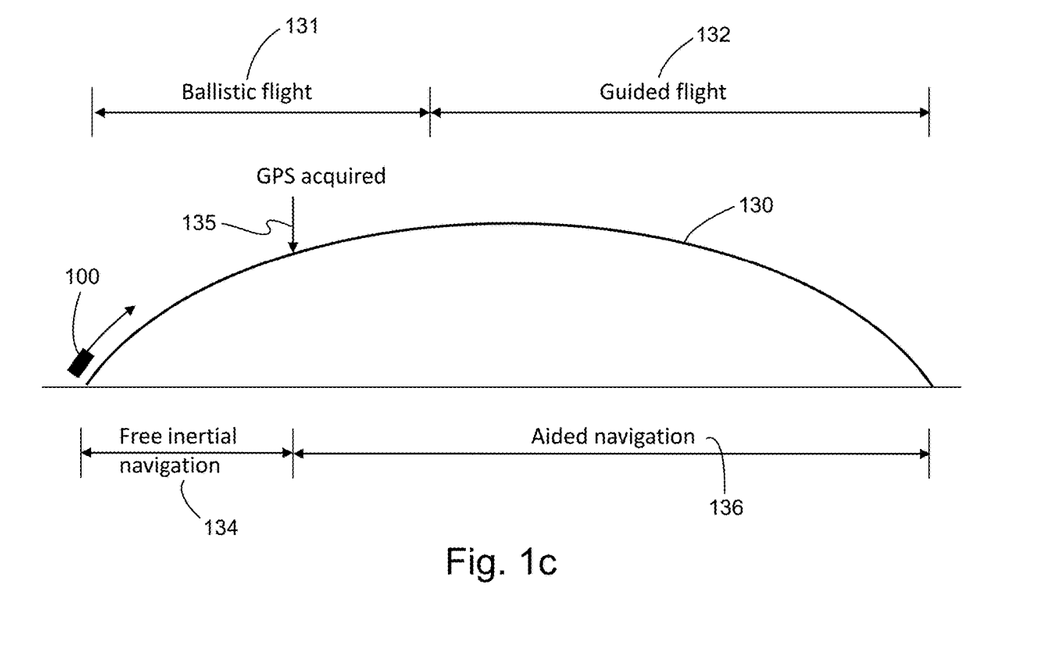
FIG. 1c illustrates different possible phases of a projectile flight.

FIG. 1c illustrates the broad problem that is addressed by this disclosure. A spinning projectile 100 follows a trajectory 130 which may be divided into a ballistic phase 131 in which the projectile 100 is subject largely only to gravity and drag, and a guided flight phase 132 in which the projectile may be more actively directed for example using control fins to alter its flight for more accurate targeting. Such fins may be controlled by the on board computer based on the calculations of the navigation system.

The trajectory 130 can also be divided into a free inertial navigation phase 134 during which navigation is based solely on initial state information loaded into the projectile 100 pre-launch combined with inertial sensor readings from the on board gyros and accelerometers. GPS signal is not acquired until around the point indicated at 135 which may be around 20-25 seconds into flight for a typical munition for example. It is during this initial free inertial phase that it is most important to constrain the inertial navigation errors as otherwise the subsequent GPS-aided navigation phase will fail. With low-grade MEMS sensors, navigation errors (if not properly constrained) can accumulate to a large degree by this point. The roll axis gyro scale factor error is the main influence on these errors and therefore this is the most important error to constrain. After GPS acquisition at point 135 the projectile 100 enters the aided navigation phase 136 in which navigation is based on GPS aided by the on board sensors.

Figure 2:
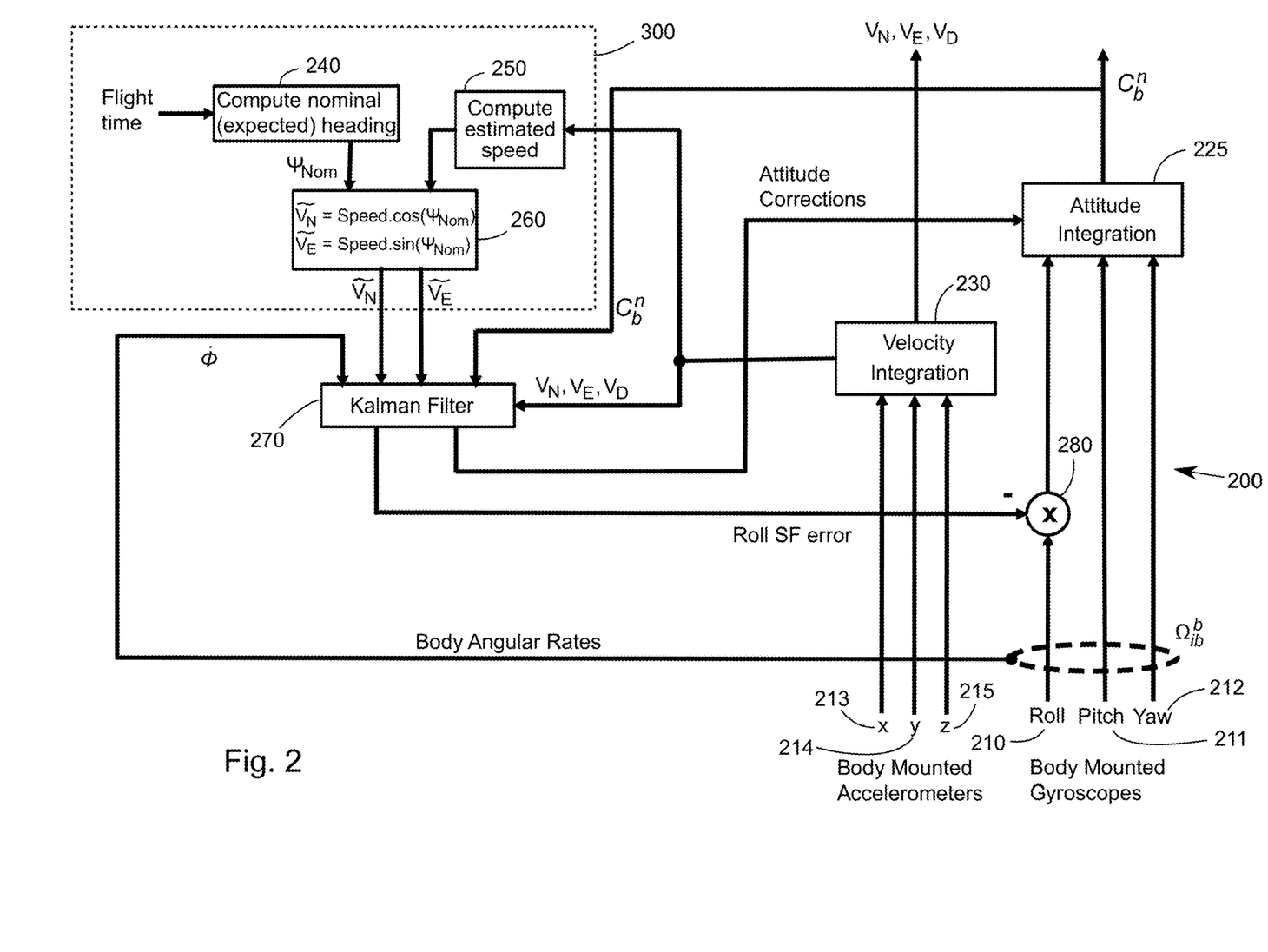
FIG. 2 shows an inertial navigation system with a roll control process.

FIG. 2 illustrates a roll angle control process of an inertial navigation system 200. The raw inputs of the inertial navigation system 200 are the roll, pitch and yaw rates from the body mounted gyroscopes indicated at 210, 211 and 212 respectively and the linear body mounted accelerometers for x, y and z axes indicated at 213, 214 and 215 respectively.

As part of the standard navigation system (ignoring for the moment the additional roll control functions of this example), the gyroscope outputs 210, 211, 212 are integrated by the attitude integration function 225 and the body mounted accelerometers 213, 214, 215 are integrated by velocity integration function 230.

FIG. 2 indicates the overall architecture, involving the roll control processes of this example in conjunction with the normal Attitude Integration function 225 and velocity integration function 230 which exist with a standard inertial Strapdown process.

In more complex systems, the attitude integration function may also take into account other corrections such as Earth Rate Correction, Transport Rate Correction, Coriolis & Centripetal Correction and Gravity Correction. These corrections and the associated transformations between reference frames are all well-known and understood and will therefore not be described further here. However, to aid understanding, the symbols in FIG. 2 have the following meanings:

$C_b{}^n$ Transformation matrix—body to navigation reference frames
$\Omega_{ib}{}^b$ Body rotation rate in the body frame of reference
$\psi_{Nom}$ Nominal Heading angle
$\dot{\varphi}$ Inertially measured roll rate
$\tilde{V}_N$ North component of pseudo-velocity measurement
$\tilde{V}_E$ East component of pseudo-velocity measurement
$\tilde{V}_D$ Down component of pseudo-velocity measurement
$V_N$ North component of inertially integrated velocity
$V_E$ East component of inertially integrated velocity
$V_D$ Down component of inertially integrated velocity The attitude angles output from the attitude integration module 225 are passed as inputs to the Kalman filter 270. Similarly, the velocity components $V_N$, $V_E$, $V_D$, output from the velocity integration module 230 are passed as inputs to the Kalman filter 270. The inertially measured roll rate $\dot{\varphi}$ is also passed directly from the roll gyro 210 to the Kalman filter 270.

The Kalman filter 270 outputs a roll scale factor error that is directly applied as a correction to the roll gyro at 280. The Kalman filter 270 also outputs attitude corrections in the form of roll angle, pitch angle and yaw angle corrections to the attitude integration unit 225.

The integrated velocity components (i.e. the velocity vector), $V_N$, $V_E$, $V_D$, output from the velocity integration unit 230 are also passed to a pseudo-velocity calculation unit 300.

Within this unit 300, the projectile's estimated speed is calculated at 250 as the root sum squared of the velocity components (i.e. $\sqrt{V_N{}^2+V_E{}^2+V_D{}^2}$). In this example, three velocity components are present, $V_N$, $V_E$, $V_D$ (being the North, East and Down components), but as discussed above it will be appreciated that a single component or two components (typically $V_N$ and $V_E$, i.e. the horizontal components) may be used in some simplified systems.

Also within unit 300, a nominal heading is provided at 240. This may simply be a stored value programmed into the navigation system prior to launch representing the launch heading. This would be adequate for the case of a projectile that is expected to follow a primarily ballistic trajectory in the early phase of flight, i.e. its heading is not expected to change. In other cases where the heading may change in a known and predictable manner, the nominal heading provided at 240 may be provided as a function of flight time, e.g. from a look-up table or calculated from a known function programmed into the navigation system.

In box 260 the estimated speed (a scalar value) and the nominal heading (a unit vector) are combined together to form velocity pseudo-measurements $\tilde{V}_N$, $\tilde{V}_E$. These velocity pseudo-measurements $\tilde{V}_N$, $\tilde{V}_E$ are provided as velocity components resolved into the navigation frame, as North and East components (as discussed above, in more complicated systems the Down component $\tilde{V}_D$ may be included here, but may be excluded in simpler systems). These pseudo-velocity components $\tilde{V}_N$, $\tilde{V}_E$ resolve the measured speed into North and East components according to the expected heading such that the ratio of North to East speeds is what would be expected from the expected heading.

The velocity pseudo-measurements $\tilde{V}_N$, $\tilde{V}_E$ are provided to the Kalman filter 270 for use in calculation of roll angle and roll scale factor error corrections.

Figure 3:
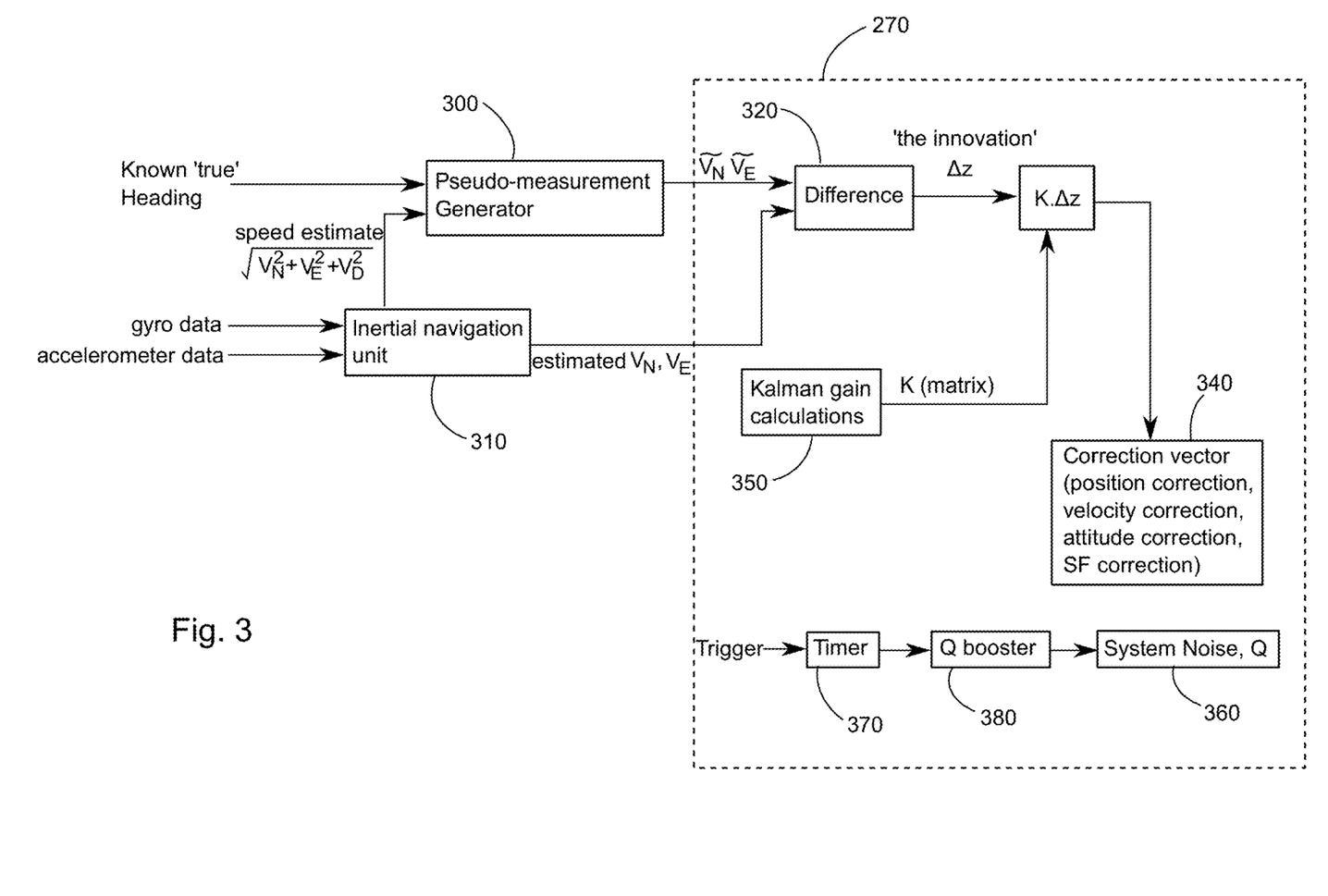
FIG. 3 schematically shows part of the Kalman filter operation.

Some aspects of the Kalman Filter 270 are illustrated in FIG. 3.

FIG. 3 shows the Inertial navigation unit 310 (encompassing velocity integration unit 230 and attitude integration unit 225) outputting its speed estimate to pseudo-velocity generator 300. The nominal heading is also provided to pseudo-velocity generator 300 in the same way as in FIG. 2.

In the Kalman filter 270, the pseudo-velocity components $\tilde{V}_N$, $\tilde{V}_E$ and the inertial navigation velocity components $V_N$, $V_E$, $V_D$ (all provided in the same reference frame, North-East-Down in this example) are provided to Difference calculator 320. Difference calculator 320 subtracts the pseudo-velocity components $\tilde{V}_N$, $\tilde{V}_E$ from the respective velocity estimate components $V_N$, $V_E$ from the inertial navigation unit 310, outputting vector $\Delta Z$. $\Delta Z$ is treated by the Kalman filter 270 as the 'innovation', i.e. the residual error measurement. The Kalman filter state is then updated by adding a correction vector 340 which is calculated by multiplying the 'innovation' $\Delta Z$ by the Kalman gain matrix K, calculated at 350.

The other aspects of the Kalman filter operation are standard and are therefore not described here.

In normal Kalman filter operation the 'innovation' is calculated as the difference between the current estimate of a variable and an independent measurement of the same variable provided by a sensor or other measurement source. Therefore in this example, the pseudo-velocity measurements $\hat{V}_N$, $\hat{V}_E$ are taken as an independent source of velocity measurement. Applying the pseudo-velocity measurement updates in the early flight phase when no other aiding sensor measurements are available constrains the growth of attitude errors within the system. It should be appreciated that in the later phase of flight when GPS measurements may be available these would be used in place of the pseudo-velocity measurements within the Kalman filter During the pseudo-velocity measurement update phase and prior to GPS acquisition, the pseudo-velocity updates serve to restrict the growth of attitude errors by constantly estimating and correcting errors in the roll gyro scale factor estimate and by making direct corrections to the attitude angles. The filter 270 will also be estimating and applying position and velocity corrections at this time, but these will not be accurate; the reason for this is that the pseudo-velocity measurements are only accurate in a ratiometric sense—the scalar estimate of speed is correctly partitioned into north and east velocity components using the known, true heading, but the speed estimate itself will not be accurate and thus the pseudo-velocity measurements will not be accurate in an absolute sense.

This effect is not explicitly modelled and the Kalman filter's estimates of position and velocity uncertainties will therefore be optimistic—the filter 270 believes it is getting good estimates of velocity from the pseudo-measurements, but it isn't. Instead it is only receiving a good indication of the ratio of north velocity to east velocity.

The problem with this is that the filter will be poorly conditioned at the point in time at which GPS is acquired and accurate position and velocity updates become available. The difference between current position and velocity estimates within the filter 270 and the GPS-supplied updates could be large and will generally by significantly larger than the prevailing uncertainty levels calculated by the filter 270. It is desirable to avoid this situation and a solution is to manipulate position and velocity state uncertainties in the filter 270 at the point of GPS acquisition. A technique called Q-boosting can be used. The Q matrix (or 'system noise matrix') is the mechanism for introducing uncertainty into the way the various system states propagate over time. Having non-zero values in the Q-matrix recognises that, although the filter 270 has a model of the propagation characteristics, the model is not perfect and some 'fuzziness' is required.

Therefore at the point of GPS acquisition and for some fixed period thereafter, the system noise added to the velocity states is artificially elevated, e.g. using a multiplicative factor. This elevated velocity uncertainty propagates quite naturally to the position states so there is no need to explicitly manipulate the position uncertainties.

This process is illustrated in FIG. 3 by system noise matrix 360. When a trigger occurs (e.g. a pre-determined period of time or a GPS acquisition signal), a timer 370 causes Q booster 380 to inject noise into the system noise matrix 360 (specifically onto the velocity elements of system noise matrix 360) for a limited period of time.

The invention claimed is:

1. An inertial measurement system for a spinning projectile comprising:
   a first, roll gyro to be oriented substantially parallel to the spin axis of the projectile;
   a second gyro and a third gyro with axes arranged with respect to the roll gyro such that they define a three dimensional coordinate system;
   at least a first linear accelerometer
   a controller, arranged to:
   compute a current projectile attitude from the outputs of the first, second and third gyros, the computed attitude comprising a roll angle, a pitch angle and a yaw angle;
   compute a current projectile velocity vector from the outputs of at least the first linear accelerometer;
   combine a magnitude of said velocity vector with an expected direction for said vector to form a current projectile pseudo-velocity vector;
   provide the velocity vector and the pseudo-velocity vector to a Kalman filter that outputs a roll gyro scale factor error calculated as a function of the difference between the velocity vector and the pseudo-velocity vector; and
   apply the roll gyro scale factor error from the Kalman filter as a correction to the output of the roll gyro.

2. An inertial measurement system as claimed in claim 1, wherein the velocity vector and the pseudo-velocity vector each comprise two or more components of velocity; and wherein the velocity vector and the pseudo-velocity vector preferably each comprise two velocity components in the horizontal plane.

3. An inertial measurement system as claimed in claim 2, wherein said components are components in a navigation frame of reference.

4. An inertial measurement system as claimed in claim 1, wherein the difference between the velocity vector and the pseudo-velocity vector is treated as a velocity component of a Kalman filter innovation vector.

5. An inertial measurement system as claimed in claim 4, wherein the Kalman filter is arranged to update its state vector by adding a product of its gain matrix and said innovation vector.

6. An inertial measurement system as claimed in claim 1, wherein the controller is further arranged to increase velocity uncertainty in the Kalman filter when a subsequent phase of projectile flight commences.

7. An inertial measurement system as claimed in claim 6, wherein said subsequent phase of flight begins when a GPS signal is acquired.

8. An inertial measurement system as claimed in claim 6, wherein the controller is arranged to increase velocity uncertainty for a predetermined period of time.

9. An inertial measurement system as claimed in claim 6, wherein the controller is arranged to increase velocity uncertainty by adding system noise to the Kalman filter.

10. An inertial measurement system as claimed in claim 1, wherein the projectile is a longitudinal projectile and the spin axis is the longitudinal axis.

11. An inertial measurement system as claimed in claim 1, wherein the controller is arranged to apply the roll rate scale factor correction directly to the roll gyro output, and is arranged to apply the roll angle correction to an attitude integration unit.

12. An inertial measurement system as claimed in claim 1, wherein the roll gyro is a MEMS gyro.

13. An inertial measurement system as claimed in claim 1, wherein the expected direction for the velocity vector as a function of flight time corresponds to the direction expected from planar ballistic flight; or wherein the expected direction for the velocity vector as a function of flight time is taken from a pre-computed flight trajectory which may be non-planar.

14. An inertial measurement system as claimed in claim 1, wherein the roll angle correction and roll scale factor correction are only applied prior to any guidance action being initiated.

15. A method of correcting roll angle in an inertial measurement system for a spinning projectile, comprising:
  computing a current projectile attitude from the outputs of first, second and third gyros, the computed attitude comprising a roll angle, a pitch angle and a yaw angle;
  computing a current projectile velocity vector from the outputs of at least a first linear accelerometer;
  combining a magnitude of said velocity vector with an expected direction for said vector to form a current projectile pseudo-velocity vector;
  providing the velocity vector and the pseudo-velocity vector to a Kalman filter that outputs a roll gyro scale factor error calculated as a function of the difference between the velocity vector and the pseudo-velocity vector; and
  applying the roll gyro scale factor error from the Kalman filter as a correction to the output of a roll gyro.

* * * * *